United States Patent
Gago Tripero et al.

(10) Patent No.: US 8,359,930 B2
(45) Date of Patent: Jan. 29, 2013

(54) PIN BEARING ARRANGEMENT FOR AIRCRAFT LANDING GEAR

(75) Inventors: Angel Manuel Gago Tripero, Madrid (ES); José Luis López Arévalo, Madrid (ES)

(73) Assignee: Eads Construcciones Aeronauticas, S.A., Madrid (ES)

( * ) Notice: Subject to any disclaimer, the term of this patent is extended or adjusted under 35 U.S.C. 154(b) by 275 days.

(21) Appl. No.: 12/869,309

(22) Filed: Aug. 26, 2010

(65) Prior Publication Data

US 2011/0303788 A1 Dec. 15, 2011

(30) Foreign Application Priority Data

Jun. 14, 2010 (EP) .................................. 10382172

(51) Int. Cl.
*G01B 5/30* (2006.01)
(52) U.S. Cl. ............................. 73/760; 73/802
(58) Field of Classification Search .................. 73/760, 73/802
See application file for complete search history.

(56) References Cited

U.S. PATENT DOCUMENTS

| | | | | |
|---|---|---|---|---|
| 4,007,894 A | * | 2/1977 | Hartel | 244/104 FP |
| 5,167,385 A | | 12/1992 | Hafner | |
| 6,273,613 B1 | * | 8/2001 | O'Brien et al. | 384/448 |
| 7,274,310 B1 | * | 9/2007 | Nance | 340/960 |
| 7,747,396 B2 | * | 6/2010 | El-Bakry et al. | 702/42 |

FOREIGN PATENT DOCUMENTS

| | | |
|---|---|---|
| GB | 2 014 731 A | 8/1979 |
| WO | WO 00/39542 A1 | 7/2000 |
| WO | WO 2006/022700 A1 | 3/2006 |

* cited by examiner

*Primary Examiner* — Max Noori
(74) *Attorney, Agent, or Firm* — Birch, Stewart, Kolasch & Birch, LLP

(57) ABSTRACT

Pin bearing arrangement (10) for measuring loads in an aircraft landing gear (1), comprising a trailing arm (2), connected to at least one of the aircraft wheels (3), and a shock absorber (4), connected to the aircraft, whereby load (11) is transferred from the trailing arm (2) to the shock absorber (4), the trailing arm (2) being rotatable with respect to the shock absorber (4), the pin bearing arrangement (10) comprising at least one strain measuring element (12) attached to the pin bearing arrangement (10) in predetermined positions, these positions being selected such that the strain measuring element (12) gives at least a minimum detectable signal when the load (11) transferred is over a first threshold value, for any value of the angle (5) adopted by the trailing arm (2) with respect to the shock absorber (4). The invention also refers to a method for providing an indication of the on-ground condition of an aircraft, using a pin bearing arrangement (10) as the one described, and to a method for determining the positioning of the at least one strain measuring element (12) in such a pin bearing arrangement (10).

17 Claims, 3 Drawing Sheets

PIN BEARING ARRANGEMENT FOR AIRCRAFT LANDING GEAR

FIELD OF THE INVENTION

The present invention relates to a pin bearing arrangement in an aircraft landing gear, to a method for determining the position of measuring devices in said pin bearing arrangement, and to a method for providing an indication of the on-ground condition of an aircraft.

BACKGROUND

When an aircraft has landed and is on ground, the landing gear of said aircraft is subjected to ground loads. The landing gear comprises a trailing arm, connected to at least one of the aircraft wheels, and a shock absorber that dissipates most of the kinetic energy coming from the ground loads when the aircraft has touched the ground, the trailing arm usually being rotatable with respect to the shock absorber. The trailing arm of the landing gear usually comprises a pin bearing arrangement fixed to the trailing arm and located between the trailing arm and the shock absorber.

Aircraft landing gears usually comprise measuring elements to provide information for determining whether the aircraft is on ground or is still in flight.

In particular cases it can occur that, in some implementations of aircraft landing gears, the assembly formed by the trailing arm and the pin bearing arrangement does not rotate any angle up to a certain ground load level, when the aircraft has touched the ground. Thus, the measuring elements are not able to measure any rotation of the trailing arm, as it is inexistent, which makes that neither micro-switches nor proximity sensors can be used as valid measuring devices in landing gear pin bearings.

Pressure sensors that would be located inside the shock absorber cannot be used as valid measuring devices either because the internal mechanical structure construction of the shock absorber does not allow the correct installation of such pressure sensors.

According to what has been said, it shall be desirable to provide pin bearings with measuring devices that are able to reliably determine whether the aircraft is on ground or is still in flight.

The solution has then been found in the use of strain gauges located in the pin bearing arrangement. It is known in the state of the art, as per EP 1147384, the location of strain gauges in pin bearings, such that these gauges can detect a constant shear force applied in a certain region of the pin bearings. However, this document is silent about its use for indication of on-ground condition. Additionally, the correct location of these gauges is very complicated in practice, and in this document is focused on the use in testing ground loads.

One of the problems of the strain gauges in implementations on pin bearings of aircraft landing gears, where the assembly formed by the trailing arm and the pin bearing does not rotate any angle up to a certain ground load level, even when the aircraft has touched the ground earlier, is that these gauges have to be sensitive enough to detect a very low threshold load level in which the aircraft has already touched the ground. Thus, to work correctly in such cases, the gauges are to be located such that they can detect a lower load: the problem of this is that the gauges can give an indication that the aircraft is on flight, when it has already touched the ground.

However, if the gauges are located in the pin bearing arrangement in a location in which they can detect higher loads, they are then subjected to high stresses for a continued period of time, which originates strong fatigue problems in these gauges, therefore making the gauges have a short life. An additional problem is that the rotation of the trailing arm with respect to the shock absorber renders very variable the measuring conditions of the gauges in the pin.

It shall thus be desirable to provide a method for determining the positioning of the measuring elements in a pin bearing arrangements, as well as a method for providing an indication of the on-ground condition of an aircraft, using a pin bearing arrangement, in order to provide a suitable solution for the above-mentioned problems.

SUMMARY OF THE INVENTION

One object of the present invention is a pin bearing arrangement for measuring loads in an aircraft landing gear. The landing gear comprises a trailing arm which is connected to at least one of the aircraft wheels, and a shock absorber which is connected to the aircraft, the trailing arm being rotatable with respect to the shock absorber. When the aircraft touches the ground, the ground load received by the aircraft is transferred from the trailing arm to the shock absorber. The pin bearing arrangement comprises at least one strain measuring element in predetermined positions, these positions being selected such that the measuring element provides at least a minimum detectable signal when the load on the trailing arm is over a first threshold value, for the whole range of angles adopted by the trailing arm with respect to the shock absorber. This first threshold value indicates that the aircraft has touched the ground, but the trailing arm has not started rotating yet with respect to the shock absorber.

The predetermined positions in the pin bearing arrangement of the invention are selected such that the strain measuring element is, for any value of the angle adopted by the trailing arm with respect to the shock absorber, always below a maximum value of working stress within the operative range of such strain measurement element. Moreover, said maximum value is such that the fatigue life of the strain measuring element is higher than the operating life of the aircraft.

Another object of the present invention is an aircraft landing gear that comprises a pin bearing arrangement as the one described above.

A method for providing an indication of the on-ground condition of an aircraft is another object of the invention, this method using a pin bearing arrangement in which there is at least one strain measuring element attached, the pin bearing arrangement rotatably connecting a trailing arm and a shock absorber.

Still another object of the invention is to provide a method for determining the positions of the strain measuring element in the pin bearing arrangement.

Yet another object of the invention is an aircraft comprising a landing gear that comprises a pin bearing arrangement as the one described above.

Another object of the invention is an aircraft comprising a pin bearing arrangement as the one described above.

Other features and advantages of the present invention will be understood from the following detailed description in relation with the enclosed drawings.

DETAILED DESCRIPTION OF PREFERRED EMBODIMENTS

Figure 1A:
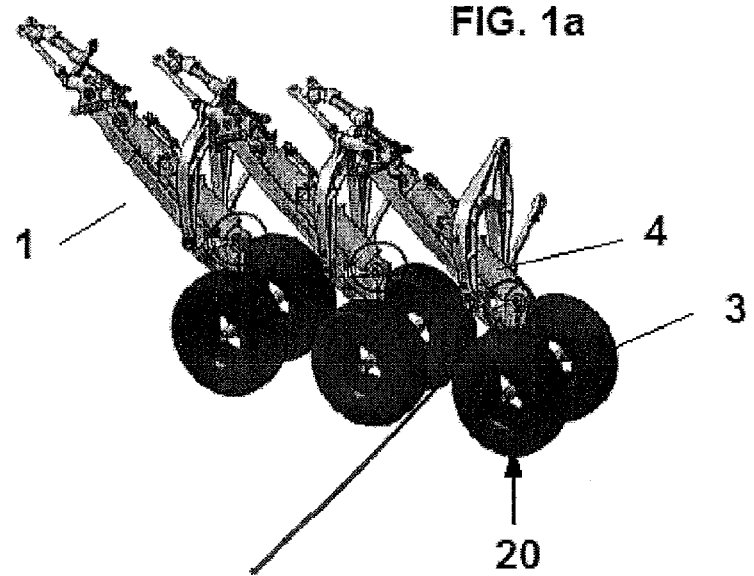
FIGS. 1a and 1b show views of an aircraft landing gear comprising a pin bearing arrangement according to the present invention.
Figure 1B:
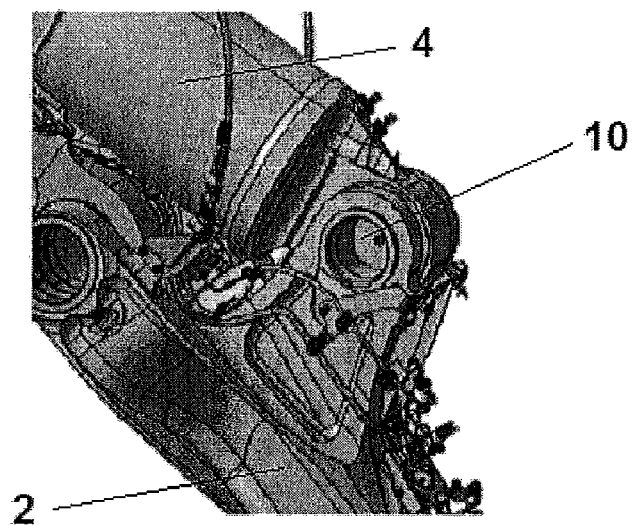

A preferred embodiment of this invention will be described in connection with an aircraft landing gear 1 comprising a trailing arm 2, connected to at least one of the aircraft wheels 3, and a shock absorber 4, dissipating most of the kinetic energy coming from the ground loads when the aircraft has touched the ground. The trailing arm 2 of the landing gear 1 comprises a pin bearing arrangement 10 fixed to the trailing arm 2 and located between the trailing arm 2 and the shock absorber 4. The trailing arm 2 is rotatable with respect to the shock absorber 4. This pin bearing arrangement 10 receives a load 11 that is the result of the ground load that has been transmitted from the aircraft wheel 3 to the shock absorber 4: when measuring the magnitude of the load 11 in the pin bearing arrangement 10, it can be determined whether or not the aircraft is already on ground.

The best place for measuring the load which originates from the ground load and is transmitted to the shock absorber 4 is the location of the pin bearing arrangement 10, which is situated between the trailing arm 2 and the shock absorber 4. In this location, the ground load is transmitted from the wheel 3 to the shock absorber 4, amplified by a non constant value, this value depending on the rotation angle 5 of the landing gear 1, this angle 5 being the angle adopted by the trailing arm 2 with respect to the shock absorber 4.

When a ground load 20 is applied on one or more of the aircraft wheels 3, part of this load 20 is transferred as load 11 through the pin bearing arrangement 10. In a preferred embodiment of the pin bearing arrangement 10 in the aircraft landing gear 1, the trailing arm 2 does not rotate with respect to the shock absorber 4, therefore the angle 5 adopted by the trailing arm 2 with respect to the shock absorber 4 has a constant value, until the ground load 20 reaches a certain value. When this occurs, the trailing arm 2 starts rotating with respect to the shock absorber 4, and the load 11 which is applied to the pin bearing arrangement 10 is then over a second threshold value (value of load 11 in FIG. 2b). However, the aircraft has already touched the ground, even when the ground load 20 is below that certain value, and the load 11 in the pin bearing arrangement is below that certain second threshold value (value of load 11 in FIG. 2a). Therefore, the load 11 to be detected by the pin bearing arrangement 10, indicating that the aircraft has already touched the ground, is below that second threshold value of FIG. 2b, but it is over a first threshold value, which is to be established.

The pin bearing arrangement 10 according to the invention comprises at least one strain measuring element 12, that effects the measurement of the load 11 applied to the pin bearing arrangement 10, as a function of the extension suffered by said strain measuring element 12. Thus, as it has just been mentioned, the strain measuring element 12 has to be calibrated in order to have a sensitivity to be able to detect a load 11 applied on the pin bearing arrangement which is below the second threshold value, but over the first threshold value, therefore effecting a correct indication that the aircraft has already touched the ground.

The strain measuring element 12 is preferably a strain gauge bridge, with four or more gauges forming a Wheatstone bridge arrangement, but can also be a single strain gauge, or a combination of single gauges with bridges.

In the pin bearing arrangement 10 according to the invention, the strain measuring element 12 is attached in predetermined positions, these positions being selected such that the strain measuring element 12 is, for any value of the angle 5 adopted by the trailing arm 2 with respect to the shock absorber 4, always below a maximum value of working stress within the operative range of such strain measurement element 12. In a preferred embodiment of the invention, said maximum value is such that the fatigue life of the strain measuring element 12 is higher than the operating life of the aircraft. In another preferred embodiment, this maximum value is such that the fatigue life of the strain measuring element 12 is higher than five times the operating life of the aircraft: the definition of five times is made according to US FAR regulations. The operating life of an aircraft should be at least 10,000 flights (present standard for military aircraft), which imposes at least 10 million ($10^7$) measuring cycles of the strain measuring element 12, that can sometimes go up to 80 million ($8.10^7$) measuring cycles.

Figure 2A:
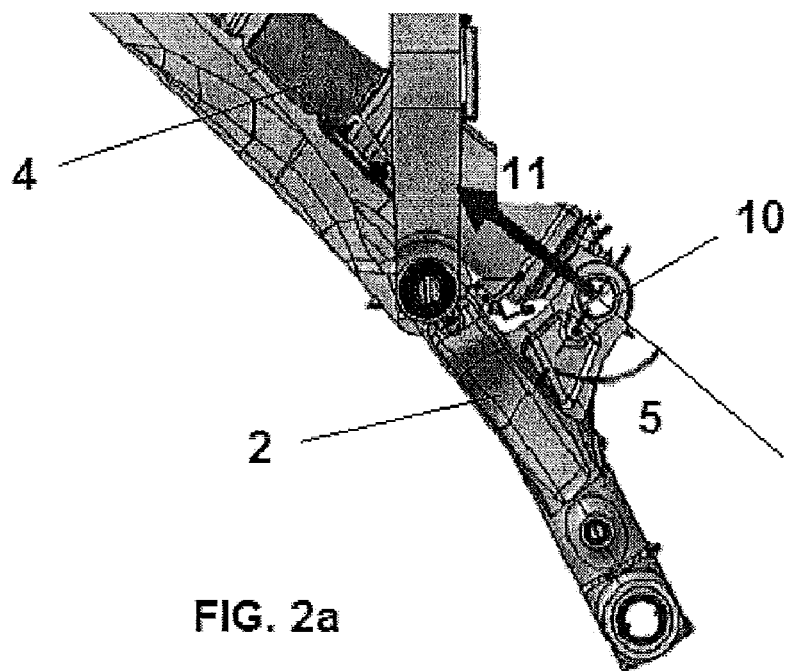
FIGS. 2a, 2b and 2c show the load applied to the pin bearing arrangement in an aircraft landing gear according to the present invention, in different moments of the progression of the aircraft ground landing.
Figure 2B:
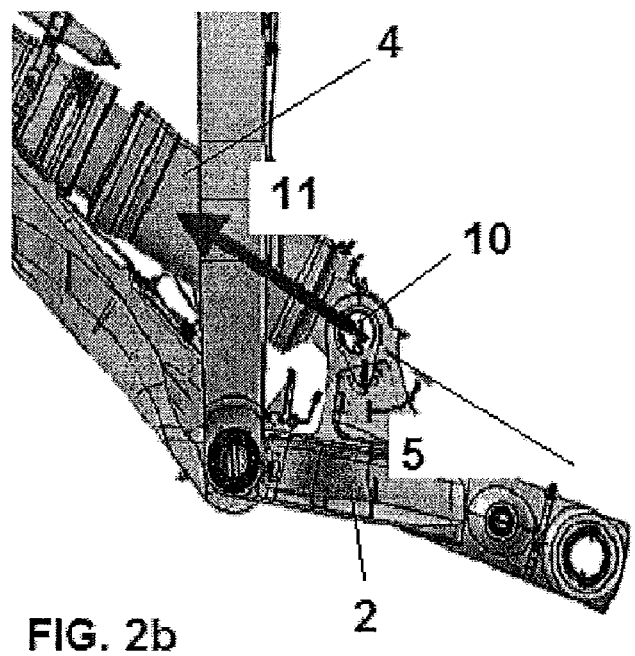
Figure 2C:
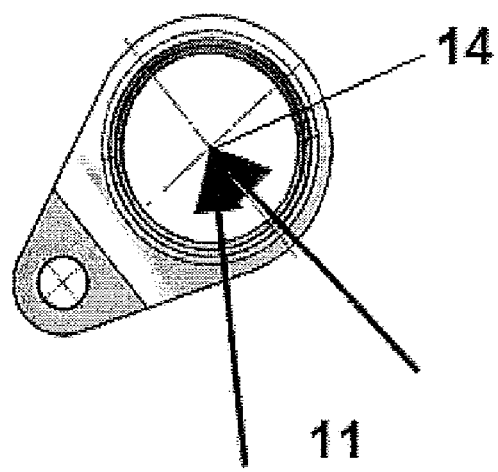

Once the trailing arm 2 has started to rotate with respect to the shock absorber 4, the magnitude of the load 11 in the pin bearing arrangement 10 starts increasing as the angle 5, which was kept constant, starts decreasing: FIGS. 2a, 2b and 2c show this tendency. In this case, the strain measuring element 12 in the pin bearing arrangement 10 is subjected to a higher value of the load 11, which increases as the rotation angle 5 decreases. Because of fatigue constraints in the strain measuring element 12, the maximum value of the load 11 applied to the pin bearings 10 has to be limited, in order to provide the strain measuring element 12 with a longer life.

The strain measuring element 12 has to be reliable and operative along the complete aircraft life, which is typically calculated for 30 years. The strain measuring element 12 has to work at very critical working conditions, assuring no failures at limit loads, and obtaining a minimum sensitivity, typically of 0.3 mvN/90KN, when static loads 11 are applied on the pin bearing arrangement 10. As to fatigue loads on the strain measuring element 12, it must be assured that the element 12 does not have any failure due to fatigue loads, in the total aircraft life. Moreover, the element 12 has to be able to work at critical temperature conditions, varying from −54° C. to +80° C.

According to a preferred embodiment of the invention, the number of strain measuring elements 12 is of at least two, these elements 12 being circumferentially spaced from each other at least 90° in the pin bearing arrangement 10. Another preferred embodiment locates the strain measuring elements 12 approximately diametrically opposed with respect to the axis 14 of the pin bearing arrangement 10.

The signal given by the strain measuring element 12 is used, alone or in combination with other signals, to provide an indication of the on-ground condition of an aircraft that comprises a pin bearing arrangement 10 as the one described in the invention, or an indication of the in-flight condition of such an aircraft.

The present invention also describes a method for providing an indication of the on-ground condition of an aircraft, using a pin bearing arrangement 10, which rotatably connects a trailing arm 2, connected to at least one of the aircraft wheels 3, and a shock absorber 4, connected to the aircraft, whereby the load 11 is transferred from the trailing arm 2 to the shock absorber 4. This method comprises the following steps:

a) obtaining a signal from at least one strain measuring element 12 attached to the pin bearing arrangement 10 in predetermined positions; and b) using such signal to, alone or in combination with other signals, provide an indication of on- ground condition, or of the in-flight condition of such aircraft.

Step a) of the method described according to the invention also comprises the steps of:

a1) obtaining a signal of the resistive type from the at least two strain measuring element 12 attached to the pin bearing arrangement 10 in predetermined positions; and a2) conditioning and processing the resistive type signal into an inductive type signal, able to be understood and used by the existing aircraft systems.

Moreover, the invention describes a method for determining the positions of the at least one strain measuring element 12 in the pin bearing arrangement 10 of an aircraft landing gear 1, this method comprising the following steps:

a) determining a minimum detectable value of the signal to be given by the strain measuring element 12, that is reliable, this value corresponding to the first threshold value of the load 11 in the pin bearing arrangement 10;

b) determining a maximum working stress for the strain measuring element 12, such that the fatigue life of the strain measuring element 12 is higher than the operating life of the aircraft ; and c) calculating and/or testing for different positions of the strain measuring element 12, and over the whole range of vectors, in module and direction, of the loads 11 transferred by the pin bearing arrangement 10, in order to determine the optimum range of positions of the strain measuring element 12 that give values over a) but below b).

Preferably, the optimum range in step c) is obtained by computational models, experimental measurements, or combinations thereof.

Figure 3:
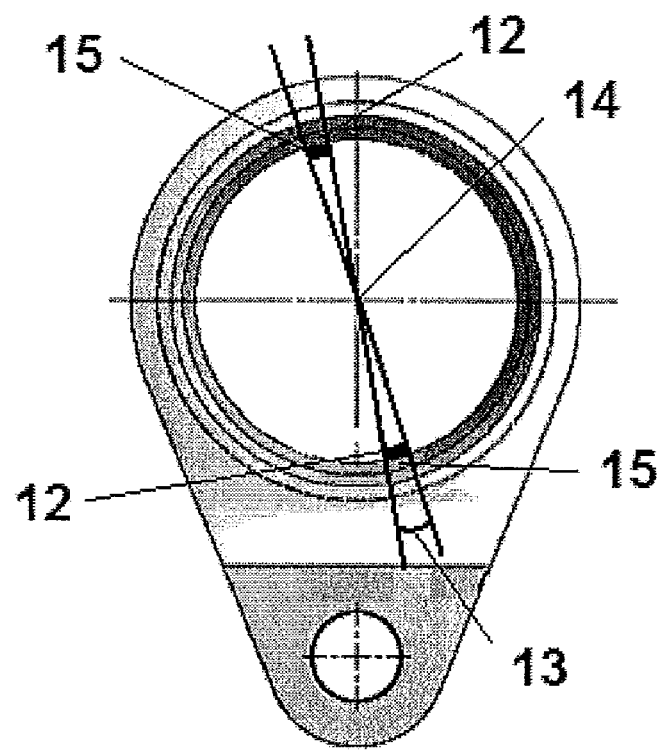
FIG. 3 shows the optimum angle for positioning the measuring devices in the pin bearing arrangement for an aircraft landing gear according to the present invention.

As a result of the mentioned just described, in a preferred embodiment of the invention comprising at least two strain measuring elements 12, the optimum positioning of the strain measuring elements 12 in the pin bearing arrangement 10 is obtained: the strain measuring elements 12 are to be optimally situated in an area 15 of the pin bearing arrangement 10, which will preferably form an angle 13 with respect to the axis 14 of the pin bearing 10, such that the strain measuring elements 12 are located at positions approximately diametrically opposed with respect to said axis 14 (FIG. 3), this angle 13 being measured with respect to the load direction entering the shock absorber 4. The positioning of the strain measuring elements 12 is that they are circumferentially spaced from each other at least 90°, in the pin bearing arrangement 10.

The angle 13 that provides the optimum location of the strain measuring elements 12 in the pin bearing arrangement 10 is determined by both finite elements analysis and test results, in order to accomplish the considerations and requirements mentioned for the strain measuring elements 12.

In a preferred embodiment of the invention, the angle 13 for positioning the strain measuring elements 12 is comprised between the values of 10° and 25°. More preferably, the value of the angle 13 is 20°.

As already mentioned, the main considerations to be taken into account in the calculation of the location of the strain measuring elements 12 in the pin bearing arrangement 10 are the following:

the load 11 acting on the pin bearing 10 creates areas having a very high stress, being the elements 12 usually located in said areas, as they can provide a more reliable measurement, because the material of the pin bearing 10 has a high yield stress limit, and the design of the pin bearings 10 is done such that these pin bearings 10 work at high stress levels;

at those high stress working values, the strain measuring elements location is not obvious, as the strain measuring elements 12 could fail after a very small number of landings of the aircraft if they are working outside their operational fatigue range, typically of 350 to 400 MPa, for a reliability of at least $10^{-7}$;

the strain measuring elements location has to provide detectable signal at the desired load detection level and angle, but this signal cannot decrease when the load 11 applied on the pin bearing arrangement 10 rotates around the axis 14; and considering the high stress working values of the strain measuring elements 12, they need to have appropriate dimensions for the existing axial length of the pin bearing arrangement 10 in order to be correctly integrated.

Although the present invention has been fully described in connection with preferred embodiments, it is evident that modifications may be introduced within the scope thereof, not considering this as limited by these embodiments, but by the contents of the following claims.

The invention claimed is:

1. A pin bearing arrangement for measuring loads in a landing gear of an aircraft, comprising:

a trailing arm connected to at least one wheel of the aircraft, and a shock absorber connected to the aircraft, the pin bearing arrangement being fixed to the trailing arm and located between the trailing arm and the shock absorber, whereby the loads are transferable from the trailing arm to the shock absorber, and the trailing arm is rotatable with respect to the shock absorber;

wherein at least two strain measuring elements are attached to the pin bearing arrangement in predetermined positions, wherein the positions are selected such that one of the strain measuring elements gives at least a minimum detectable signal when the load transferred is over a first threshold value, for any value of an angle adopted by the trailing arm with respect to the shock absorber.

2. The pin bearing arrangement according to claim 1, wherein the predetermined positions are selected such that the strain measuring elements are, for any value of the angle adopted by the trailing arm with respect to the shock absorber, always below a maximum value of working stress within an operative range of the strain measurement elements.

3. The pin bearing arrangement according to claim 2, wherein said maximum value is such that a fatigue life of the strain measuring elements is higher than the operating life of the aircraft.

4. The pin bearing arrangement according to claim 1, wherein the predetermined positions are approximately diametrically opposed with respect to an axis of the pin bearing arrangement.

5. The pin bearing arrangement according to claim 1, wherein each of the strain measuring elements is a strain gauge or a strain gauge bridge.

6. The landing gear of the aircraft comprising the pin bearing arrangement according to claim 1.

7. The landing gear of the aircraft according to claim 6, wherein the trailing arm starts rotating with respect to the shock absorber when the load on the trailing arm is over a second threshold value.

8. A landing gear of an aircraft, comprising:
- a trailing arm connected to at least one wheel of the aircraft, and
- a shock absorber connected to the aircraft,
- a pin bearing arrangement for measuring loads in the landing gear, the pin bearing arrangement being fixed to the trailing arm and located between the trailing arm and the shock absorber,
- whereby loads on the landing gear are transferable from the trailing arm to the shock absorber, and the trailing arm is rotatable with respect to the shock absorber;
- wherein at least two strain measuring elements are attached to the pin bearing arrangement in predetermined positions,
- wherein the positions are selected such that one of the strain measuring elements gives at least a minimum detectable signal when the load transferred is over a first threshold value, for any value of an angle adopted by the trailing arm with respect to the shock absorber,
- wherein the signal given by the strain measuring element is used to, alone or in combination with other signals, provide an indication of an on-ground condition of the aircraft, or an indication of an in-flight condition of the aircraft.

9. An aircraft comprising the landing gear according to claim 8.

10. The method for providing an indication of an on-ground condition of an aircraft, using a pin bearing arrangement comprising:
- a trailing arm connected to at least one wheel of the aircraft, and
- a shock absorber connected to the aircraft,
- the pin bearing arrangement being fixed to the trailing arm and located between the trailing arm and the shock absorber,
- whereby loads on the trailing arm are transferable from the trailing arm to the shock absorber, and
- at least two strain measuring elements are attached to the pin bearing arrangement in predetermined positions,
- the method comprising the steps of:
  a) obtaining a signal from at least one of the strain measuring elements attached to the pin bearing arrangement; and
  b) using the signal to, alone or in combination with other signals, provide an indication of the on-ground condition of the aircraft, or an indication of an in-flight condition of the aircraft.

11. The method according to claim 10, wherein the strain measuring element is a strain gauge, a strain gauge bridge or a combination of single gauges with bridges, and step a) comprises the steps of:
  a1) obtaining a signal of a resistive type from the at least two strain measuring elements; and
  a2) conditioning and processing the resistive type signal into an inductive type signal, able to be understood and used by an existing aircraft system.

12. A method for determining positioning of at least one strain measuring element in a pin bearing arrangement for measuring loads in a landing gear of an aircraft, the landing gear comprising:
- a trailing arm connected to at least one wheel of the aircraft, and
- a shock absorber connected to the aircraft,
- the pin bearing arrangement being fixed to the trailing arm and located between the trailing arm and the shock absorber,
- whereby a load is transferable from the trailing arm to the shock absorber, and the trailing arm is rotatable with respect to the shock absorber,
- at least two strain measuring elements being attached to the pin bearing arrangement in predetermined positions, the positions being selected such that one of the strain measuring elements gives at least a minimum detectable signal when the load transferred is over a first threshold value, for any value of an angle adopted by the trailing arm with respect to the shock absorber,
- the method comprising the steps of:
  a) determining a minimum detectable value of the signal to be given by the strain measuring element corresponding to the first threshold value of the load in the pin bearing arrangement;
  b) determining a maximum working stress for the strain measuring element, such that a fatigue life of the strain measuring element is higher than an operating life of the aircraft; and
  c) calculating or testing for different positions of the strain measuring element, and over a whole range of vectors, in module and direction, of the loads transferred by the pin bearing arrangement, in order to determine an optimum range of the positions of the strain measuring element that give values over the value determined in step a), but below the maximum working stress determined in step b).

13. The method according to claim 12, wherein the optimum range in step c) is obtained by computational models, experimental measurements, or combinations thereof.

14. The method according to claim 12, wherein the strain measurement elements are at least two strain measurement elements attached to the pin bearing arrangement, the predetermined positions being circumferentially spaced apart from each other by at least 90°.

15. The method according to claim 10, wherein the strain measurement elements are at least two strain measurement elements attached to the pin bearing arrangement, the predetermined positions being circumferentially spaced apart from each other by at least 90°.

16. The pin bearing arrangement according to claim 2, wherein each of the strain measuring elements is a strain gauge or a strain gauge bridge.

17. The pin bearing arrangement according to claim 3, wherein each of the strain measuring elements is a strain gauge or a strain gauge bridge.

* * * * *